United States Patent Office 2,970,421
Patented Feb. 7, 1961

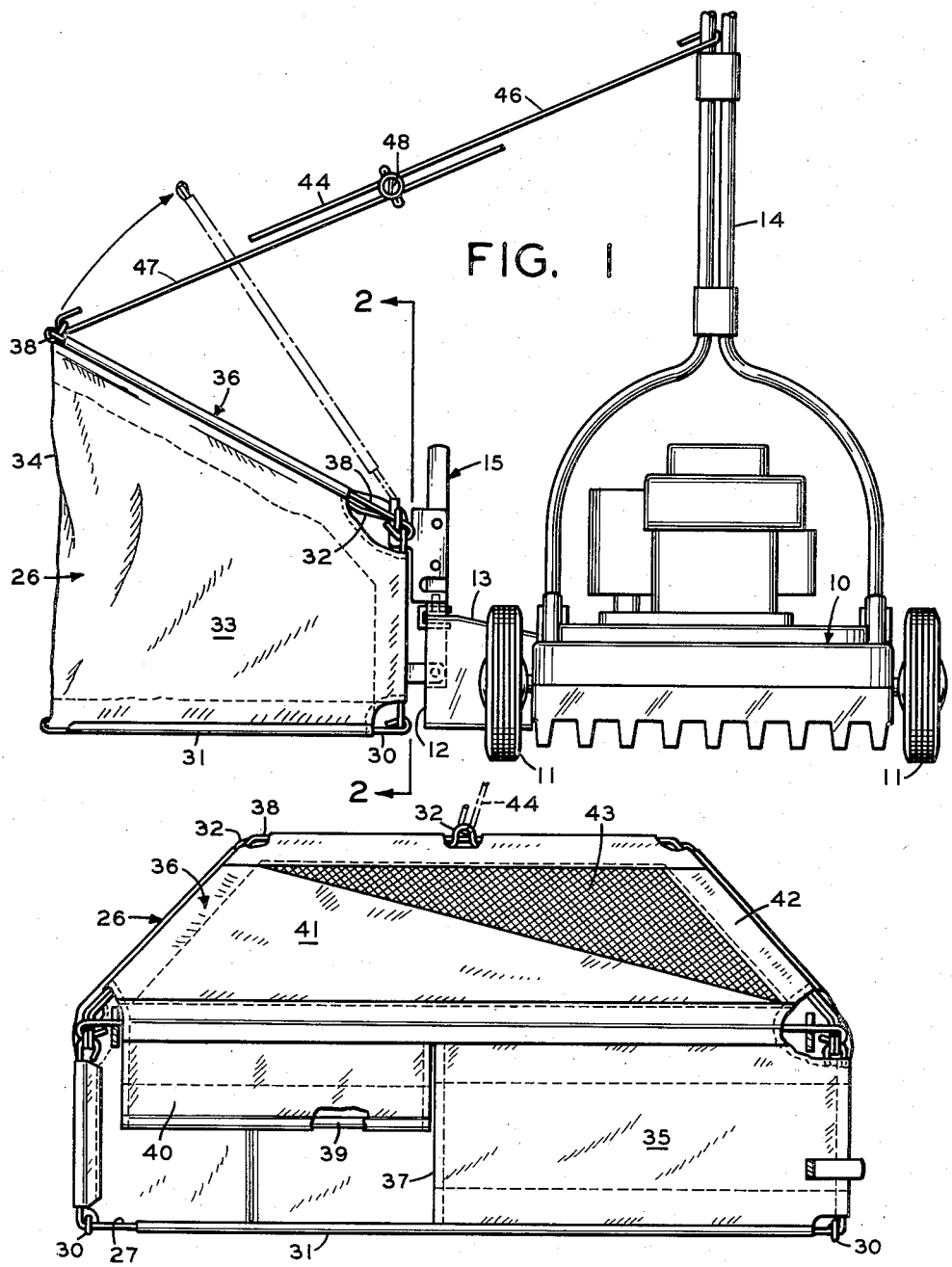

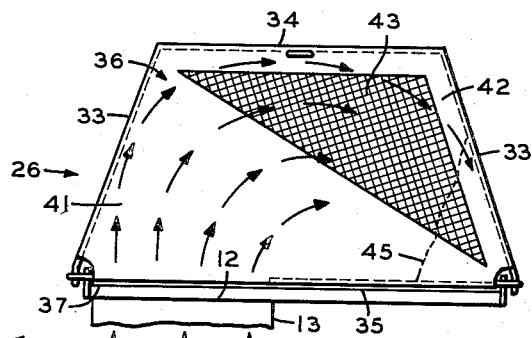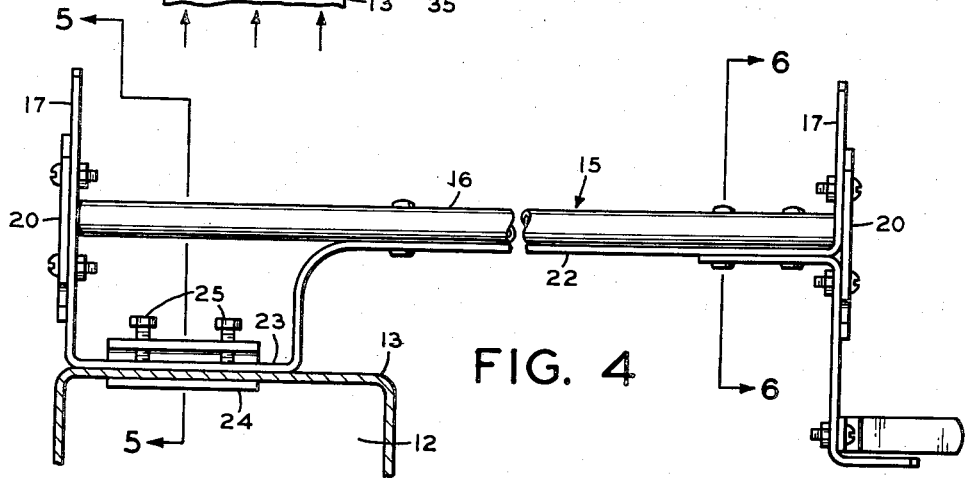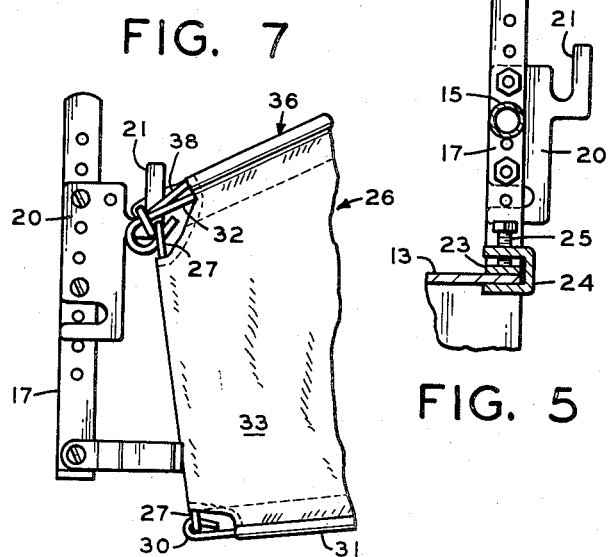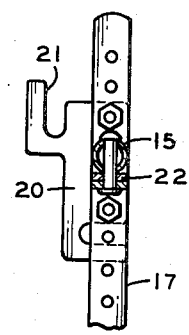

2,970,421

GRASS CATCHER

Ralph W. Krewson, Webster Groves, Mo.
(% Perfection Mfg. Co., 2701 N. Leffingwell,
St. Louis 6, Mo.)

Filed Feb. 20, 1959, Ser. No. 794,648

4 Claims. (Cl. 56—202)

This invention relates generally to improvements in a grass catcher, and more particularly to an improved device of this type adapted for use with a rotary power mower.

An important object is to provide a grass catcher that is adapted to coact with a rotary power mower having a housing provided with a lateral discharge opening.

Another important objective is realized by the provision of a bracket on the mower housing to which the catcher can be quickly and easily attached and detached.

Another important object is achieved by the novel structure of the catcher, and particularly the arrangement of the air outlet in the top wall of the device relative to the position of the air intake opening in the front wall and relative to the specific configuration of the side and rear walls. This structural arrangement enables more efficient and effective collection of grass cuttings.

Still another important object is provided by the rearwardly converging arrangement of the side walls from the front wall, by the location of the intake opening in one end of the front wall, and by the specific location of the air outlet in the top wall so that the clippings are discharged and carried in a curvilinear path with an absolute minimum of turbulence and in a manner that the other end of the catcher from the intake opening is filled first.

Yet another important object is provided by the hinged connection of the top wall of the box-like catcher which enables ready removal of clippings.

The foregoing and numerous other objects and advantages of the invention will more clearly appear from the following detailed description of a preferred embodiment, particularly when considered in connection with the accompanying drawings, in which:

Fig. 1 is a side elevational view of the catcher attached to a rotary mower;

Fig. 2 is a front elevational view of the catcher as seen along line 2—2 of Fig. 1;

Fig. 3 is a reduced top plan view of the catcher;

Fig. 4 is an enlarged elevational view of the bracket utilized in attaching the catcher to the mower;

Fig. 5 is a view, partly in section, as seen along line 5—5 of Fig. 4;

Fig. 6 is a view, partly in section, as seen along line 6—6 of Fig. 4, and

Fig. 7 is an enlarged fragmentary side view of the catcher showing its connection to the bracket at the rear end of the mower.

Referring now by characters of reference to the drawings, it is seen that the grass catcher is particularly adapted for use on a rotary type lawn mower. As is conventional, the mower includes a deck housing 10 mounted on wheels 11, the housing 10 being provided with a lateral discharge opening 12 defined by flange 13. A handle 14 is attached to the rear of housing 10 in the usual manner.

A bracket generally indicated at 15, best illustrated in Fig. 4, includes an elongate rod 16 attached to upstanding arms 17 at each end. Plates 20 are attached to the arms 17 at each end of the bracket 15, the plates 20 being provided with hook formations 21, the purpose and function of which will be described later.

A bar 22 is fastened to rod 16 and is spaced therefrom at one end of bracket 15 to provide a clamp portion 23. A U-shaped clamp portion 24 is fitted over clamp portion 23 and is attached by screws 25.

To attach the bracket 15 to housing 10, the screws 25 are loosened so that a space is provided between the clamp portion 24 and the underside of bar clamp portion 23. Then, the bar clamp portion 23 is seated on top of the flange 13 defining the discharge opening 12. The flange 13 is located in the space between the clamp portion 24 and underside of bar clamp portion 23, and the screws 25 are tightened to fix the flange 13 between the clamp portions 23 and 24. Thus, the bracket 15 is fixed to the housing 10.

The grass catcher 26 consists of a box-like enclosure that is detachably fastened to the bracket 15. The catcher 26 consists of wire frames and canvas covering.

The catcher 26 includes a substantially U-shaped front frame 27 and a second U-shaped bottom frame 20 hingedly connected to the bottom of front frame 27. A metal plate 31 constituting the bottom wall, bridges the bottom frame 30.

Another U-shaped frame 32 is hingedly connected to the top of front frame 27 and extends rearwardly above the bottom wall 31. A canvas covering is secured to and extends between the bottom frame 30 and the U-shaped frame 32 so as to provide side walls 33 and rear wall 34. Further, a canvas covering extends over the front frame 27 to provide a front wall 35. It will be particularly noted that the rear wall 34 is of smaller length than the front wall 35, and that the side walls 33 converge rearwardly from the front wall 35 to the rear wall 34, as best seen in Fig. 3.

A top wall 36 for the catcher consists of a top U-shaped frame 38 hingedly connected to the top of front frame 27 and extending over the U-shaped frame 32, and a canvas covering over the top U-shaped frame 36.

It is preferred that the depth of the catcher 26 be greater at the rear than the depth at the front, as is seen in Fig. 1.

The front wall 35 of the catcher is provided with an intake opening 37 at one end of the front wall. When the catcher 26 is attached to the bracket 15, the intake opening 37 is aligned with the discharge opening 12 of the housing 10.

A canvase flap 40 having a weight 39 sewed into its lower margin, extends downwardly into the intake opening 37, the flap being adapted to engage the top of flange 13 defining the discharge opening 12 of the housing 10. The flap 40 thus provides a more effective air seal and accommodates the intake opening 37 for discharge openings of various sizes depending upon the make and model of the lawn mower.

The top wall 36 is comprised of two sections 41 and 42 divided diagonally from the rear corner directly opposite the intake opening 37 to the other end of the front wall 35. The section 41 at the front of the catcher adjacent the intake opening 37 is covered by canvas. The other section 42 at the rear of the catcher is provided with a triangularly shaped air outlet opening 43.

To attach the catcher onto bracket 15, the front wall 35 is located adjacent the bracket 15 and the front frame 27 is fitted into the hook formations 21. Prior adjustment of the end plates 20 assures that the catcher intake opening 37 is aligned with the mower discharge opening 12 when the carrier is attached to hook formations 21.

A support wire 44 is hooked onto handle 14 and onto the U-shaped frame 32 at its rear end. The wire 44 consists of two parts 46 and 47, each part being separately attached to a clamp 48. Upon release of clamp 48, the length of each part 46 and 47 can be adjusted and then maintained by tightening the clamp 48. Thus it is seen that the wire 44 is adjustable so that the catcher can be held in the desired position shown in Fig. 1.

When the catcher is assembled to the housing 10, the grass clippings are discharged through the housing opening 12, through the catcher intake opening 37 and into the enclosure of the catcher 26. The clippings and the air stream discharge substantially tangentially with the side wall 33 immediately adjacent the intake opening 37 so that the stream curves naturally along the side wall and the rear wall 34 in a substantially arcuate path with a minimum of turbulence. The air outlet opening 43 in the top wall 36 permits the escape of air from the enclosure and causes the clippings to be deposited first at the right hand side of the enclosure, as is illustrated by reference numeral 45 (Fig. 3), until it is filled up to the intake opening 37.

The clippings can be removed from the catcher 26 by swinging the top wall 36 upwardly about its hinge connection, as illustrated in Fig. 1, and by dumping the clippings. The catcher 26 can be easily detached from the hook formations 21 in order to facilitate dumping. In use, the bracket 15 normally remains as a fixed part of the mower, while the catcher 26 is readily detachably removed from it.

Although the invention has been described by making detailed reference to a single preferred embodiment, such detail is to be understood in an instructive, rather than in any restrictive sense, many variants being possible within the scope of the claims hereunto appended.

I claim as my invention:

1. A grass catcher comprising a box-like enclosure having an elongate substantially U-shaped front frame, a substantially trapezoidal bottom wall hingedly connected to the bottom of the said front frame, a second U-shaped frame substantially trapezoidal in shape hingedly connected to the top of said front frame and extending rearwardly above the bottom wall, a canvas covering partially covering the front frame to provide a front wall and extending between the second U-shaped frame and bottom wall to provide side walls converging rearwardly, the front wall being provided with an intake opening at one end, a third U-shaped frame hingedly connected to the top of the front frame and overlying the second said U-shaped frame, and a canvas covering the third said U-shaped frame to provide a top wall, the top wall being provided with an air outlet opening at its rear diagonally opposite the intake opening provided in the front wall.

2. The combination and arrangement of elements as recited above in claim 1, but further characterized in that the said top wall is divided into two sections diagonally from the rear corner opposite the intake opening to the front corner at the other end of the front wall, the one top section at the rear of the top wall being apertured to provide said air outlet opening, the other top section at the front of the top wall being imperforate.

3. The combination and arrangement of elements as recited above in claim 2, but further characterized in that the front wall is provided with a flexible flap that extends downwardly into the air intake opening provided in the front wall, the flap being adapted to engage a housing surrounding an air discharge opening of a lawn mower to provide a more effective fit and seal.

4. A grass catcher comprising a box-like enclosure having an elongate substantially rectangular front wall, a substantially trapezoidal bottom wall hingedly connected to the bottom of said front wall, a substantially trapezoidal frame hingedly connected to the top of said front wall and extending rearwardly above the bottom wall, a canvas covering extending between the bottom wall and said trapezoidal frame to provide side walls converging rearwardly, the front wall being provided with an intake opening at one end, and a substantially trapezoidal top wall hingedly connected to the top of the front wall and overlying the said trapezoidal frame, the top wall being provided with an air outlet opening at its rear diagonally opposite the intake opening provided in the front wall.

References Cited in the file of this patent
UNITED STATES PATENTS

| | | |
|---|---|---|
| 2,783,604 | Cahill | Mar. 5, 1957 |
| 2,830,428 | Speegle | Apr. 15, 1958 |
| 2,851,844 | Bailey | Sept. 16, 1958 |
| 2,887,839 | Pommer | May 26, 1959 |